Sept. 1, 1959   M. J. WACLAWEK   2,901,923
TRANSMISSION
Filed June 25, 1956   3 Sheets-Sheet 2

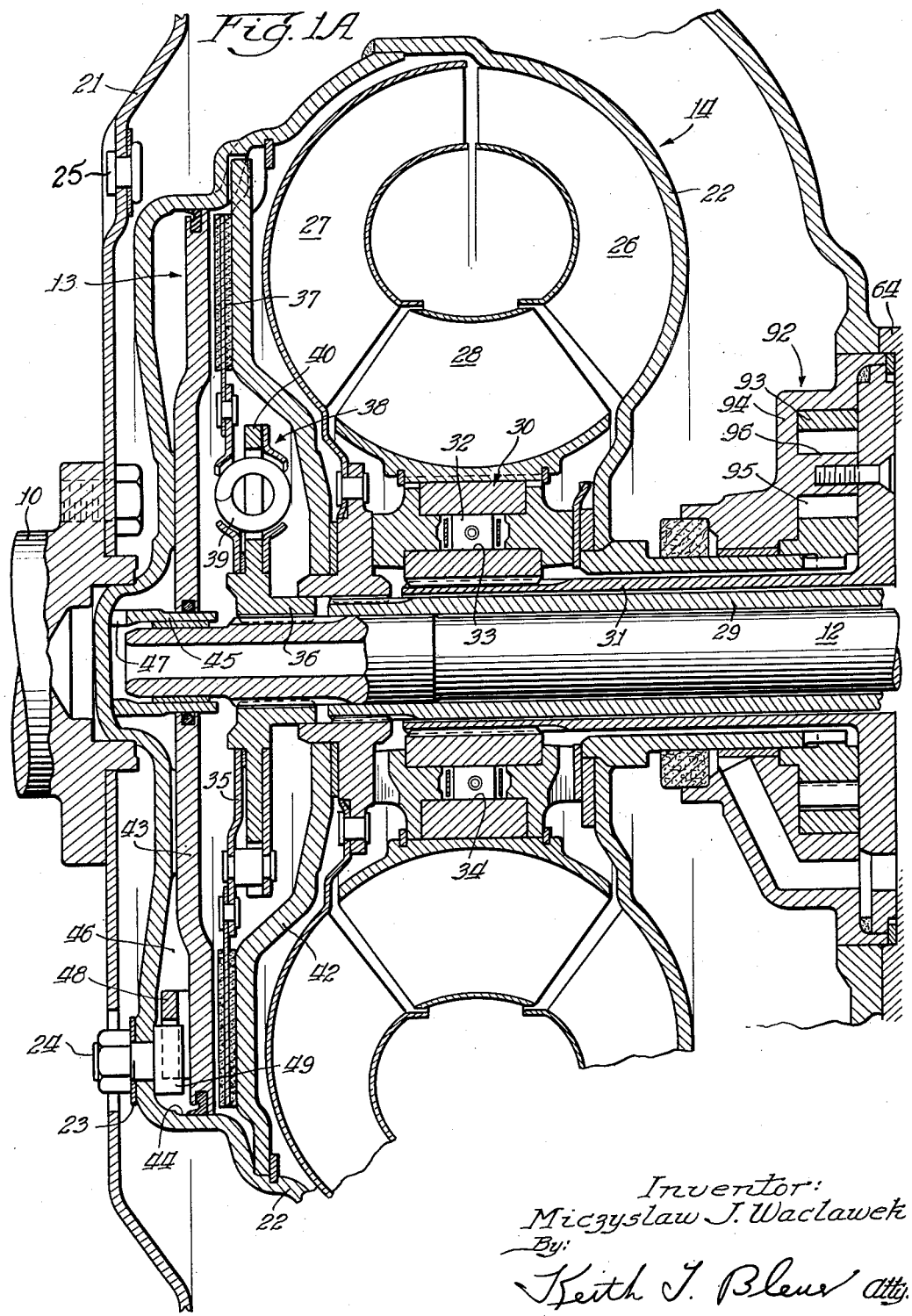

Inventor:
Miczyslaw J. Waclawek
By:
Keith J. Blewer Atty.

Sept. 1, 1959 M. J. WACLAWEK 2,901,923
TRANSMISSION
Filed June 25, 1956 3 Sheets-Sheet 3
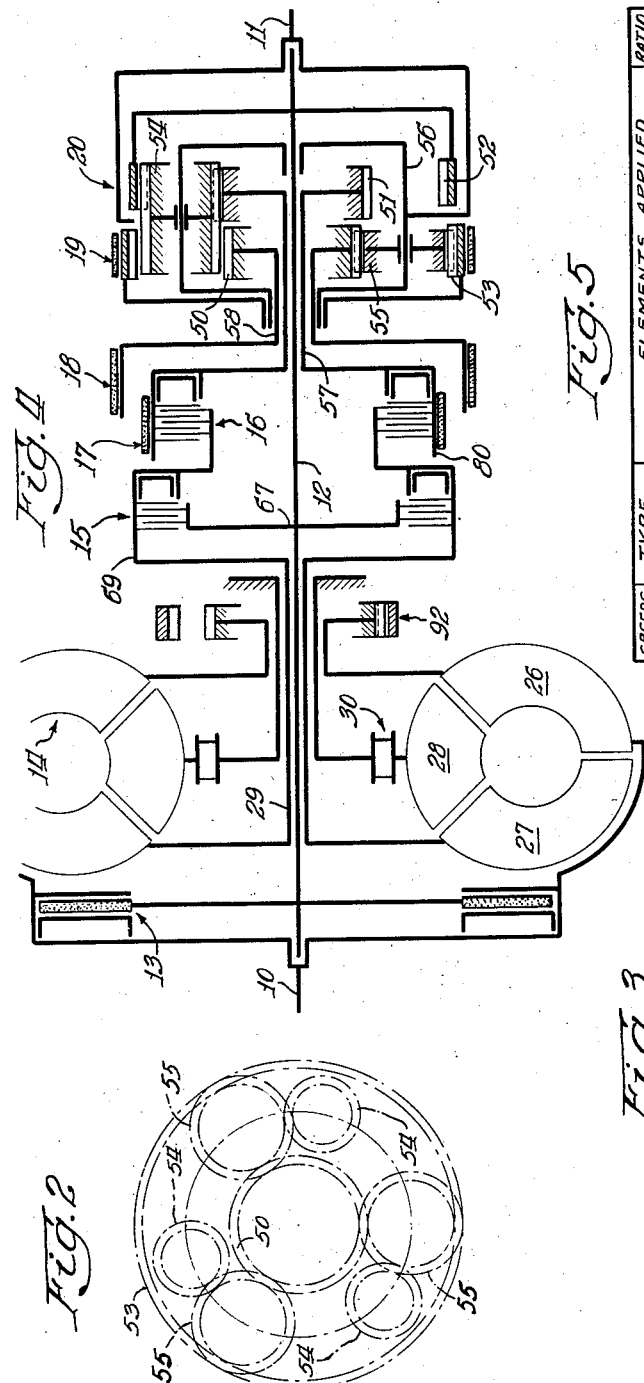
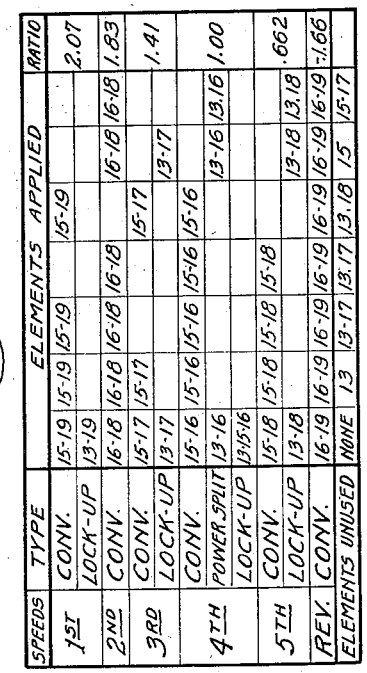
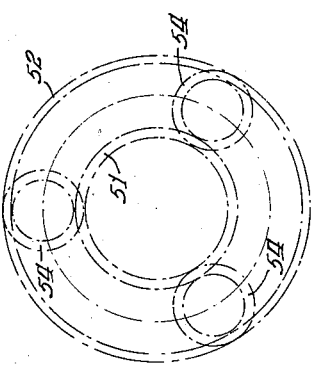
Inventor:
Miczyslaw J. Waclawek
By:
Keith J. Bleuer Atty.

United States Patent Office 2,901,923
Patented Sept. 1, 1959

2,901,923

TRANSMISSION

Miczyslaw J. Waclawek, Chicago, Ill., assignor to Borg-Warner Corporation, Chicago, Ill., a corporation of Illinois Application June 25, 1956, Serial No. 593,454

6 Claims. (Cl. 74—688)

My invention relates to transmissions for automotive vehicles.

It is an object of my invention to provide an improved transmission of this type which includes a compound planetary gear set in series with a hydrodynamic coupling to provide a plurality of forward speed drives and a drive in reverse.

It is a further object of the invention to provide a direct drive clutch in series with the planetary gear set whereby a plurality of forward speed power trains may be completed exclusive of the hydrodynamic coupling.

It is also an object of the invention to provide a direct one-to-one drive through the transmission or, alternatively, a one-to-one drive through the torque converter or, alternatively, a split one-to-one drive wherein one of the elements of the planetary gear set is driven through the torque converter and another of the gear elements is driven through the direct drive clutch.

It is still a further object of the invention to provide a plurality of friction brakes and clutches for controlling the elements of the compound planetary gear set for obtaining the various forward speed drives and a drive in reverse. More specifically it is an object of the invention to provide three brakes and two clutches for controlling the planetary gear set to provide five forward speeds and a drive in reverse.

The invention consists of the novel construction, arrangements, and devices to be hereinafter described and claimed for carrying out the above stated objects and such other objects that will appear from the following description of a certain preferred embodiment illustrated in the accompanying drawings, wherein:

Figs. 1A and 1B taken together comprise a cross-sectional view of the transmission;

Fig. 2 is a sectional view taken substantially along the lines 2—2 of Fig. 1;

Fig. 3 is a sectional view taken substantially along the lines 3—3 of Fig. 1;

Fig. 4 is a schematic illustration of the transmission; and

Fig. 5 is a chart showing the various drives available by applying the various clutches and/or brakes of the transmission.

Figure 1B:
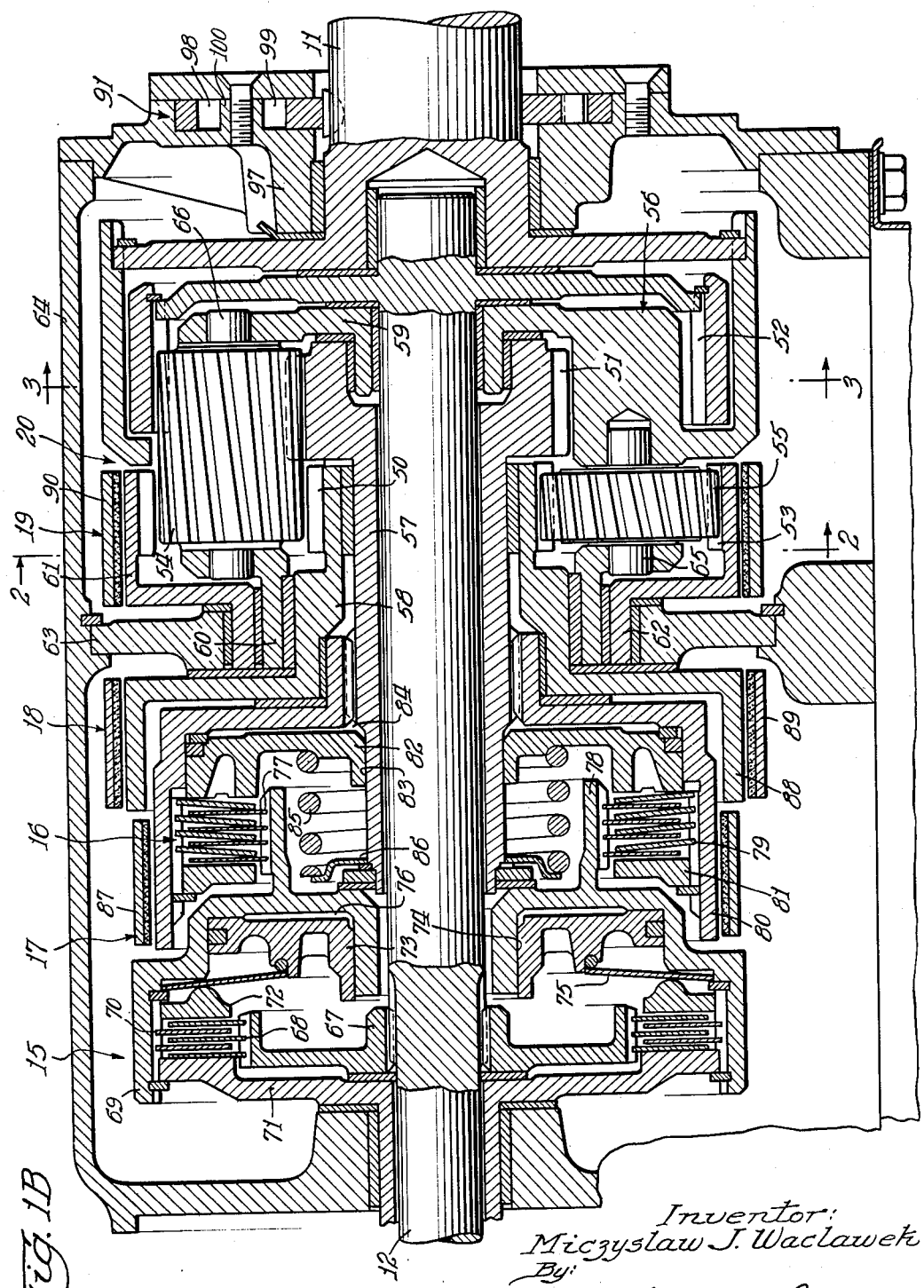

Referring to the drawings, wherein like reference numerals in the different views designate identical parts, the transmission, in general, comprises a drive shaft 10, a driven shaft 11, and an intermediate shaft 12. The shaft 10 is an extension of the crank shaft of the vehicle (not shown), and the shaft 11 is adapted to be connected to the driving road wheels of the vehicle by any suitable means. The transmission also comprises a direct drive clutch 13, a torque converter 14, friction clutches 15 and 16, friction brakes 17, 18 and 19, and a planetary gear set 20.

The drive shaft 10 has bolted thereon a flywheel 21. The torque converter 14 comprises a housing 22 flexibly connected to the flywheel 21 by means of a plurality of flexible straps 23. The ends of the straps 23 are secured to the flywheel 21 by a plurality of rivets 25, each rivet extending through aligned openings in the strap 23 and the flywheel 21. Each strap 23 is connected to the housing 22 by a securing member or bolt 24. The torque converter 14 also includes an impeller 26, the hollow shell of which is a part of and is integral with the converter housing 22. The converter 14 also includes a turbine element 27 and a stator element 28.

Two sleeve shafts 29 and 31 are disposed over the shaft 12. A one-way device 30 is disposed between the shaft 31 and the stator 28. The one-way device may be of any suitable construction and in the illustrated embodiment comprises an inner cylindrical race 33, an outer cylindrical race 34 and a plurality of tiltable grippers 32 between the races 33 and 34.

As is well known, rotation of the impeller 26 in a forward direction will cause rotation of the turbine 27 in the same direction at an increased torque due to the reaction provided by the vanes of the stator 28 tending to urge the stator in a reverse direction, which tendency is overcome by engagement of the one-way device 30. As the speed of rotation of the turbine 27 approaches that of the impeller 26, the force imposed upon the vanes of the stator 28 will reverse in direction to cause rotation of the stator in the forward direction with consequent overrunning of the one-way device 30. Thereafter the torque converter 14 functions substantially as an ordinary fluid coupling in which the impeller 26, the turbine 27, and the stator 28 all rotate at substantially the same speed.

The direct drive clutch 13 comprises a plate 35 having friction discs 37. The plate 35 is connected to a hub 36 by means of a vibration dampener 38 of well known construction. The dampener 38 comprises a plurality of springs 39 disposed in coinciding windows provided in a center hub 40, and windows in the disc 35. The clutch 13 comprises also an axially fixed stationary plate 42 fixed within the housing 22 and an annular piston 43 disposed on the other side of the disc 35. An annular cavity 44 is formed within the housing 22 and is defined at its center by means of an inwardly extending hub 45, and the piston 43 is slidably disposed within the cavity 44. The cavity 44 forms a chamber 46 between the piston 43 and the adjacent end of the housing 22, and the hub 45 is provided with an opening 47 therethrough for supplying fluid under pressure to the chamber 46. The piston 43 is prevented from rotating with respect to the housing 22 by means of an element 48 fixed to the piston 43 and slotted to receive a head 49 of the bolt 24.

The planetary gear set 20 comprises a relatively small sun gear 50, a relatively large sun gear 51, a relatively small ring gear 52, a relatively large ring gear 53, a plurality of elongated planet gears 53 in mesh with the sun gear 51 and the ring gear 52, a plurality of short planet gears 55 in mesh with the sun gear 50 and the ring gear 53 and also in mesh with the planet gears 54, and a planet gear carrier 56. The sun gear 51 is formed on a sleeve shaft 57 which is rotatable on the intermediate shaft 12; the sun gear 50 is formed on a short sleeve shaft 58 which is rotatably disposed on the sleeve shaft 57; the planet gear carrier 56 comprises end portions 59 and 60, the portion 59 being rotatably disposed on the intermediate shaft 12 and the end portion 60 being rotatably disposed on the sleeve shaft 58; and the ring gear 53 is formed within a drum 61 formed integrally with a shaft portion 62 which is rotatably disposed on the end portion 60 of the carrier 56 and within an annular casing 63 fixed within the transmission case 64.

The planetary gear carrier 56 comprises a plurality of stub shafts 65 on each of which one of the planet gears 55 is mounted and a plurality of stub shafts 66 on each of which are mounted the planet gears 54. The planet gear carrier 56 is connected to the driven shaft 11 which is driven thereby.

The clutch 15 comprises a hub 67 carrying a plurality of discs 68 and a drum portion 69 in which a plurality of discs 70 are disposed and which are interleaved with the discs 68. The drum 69 is connected to the shaft 29 by means of an annular disc portion 71. A movable annular pressure plate 72 is disposed on an end of the stacked discs 68 and 70 and is adapted to compress the discs against one another. An annular piston 73 is disposed in an annular cavity 74 provided in the drum 69. A chamber 76 is provided between one end of the piston 73 and the adjacent portion of the drum 69 for receiving fluid under pressure from the fluid pumps, to be hereinafter described, to actuate the piston 73 and apply the clutch 15. Fluid under pressure applied to the piston 73 is transmitted to the pressure plate 72 through a spring strut 75. The strut 75 at its inner periphery is acted on by the piston 73 so that its inner periphery moves axially with respect to its outer periphery and moves the pressure plate 72 which is acted on by the strut 75 at intermediate points thereof. The resilient action of the spring strut 75 functions to return the piston to its illustrated position when fluid pressure, applied to the chamber 76, is released.

The clutch 16 comprises a plurality of discs 77 splined to the exterior of a cylindrical portion 78 fixed to the drum 69 and a plurality of annular discs 79 splined within a drum 80. The drum 80 is splined to the shaft 57. An annular fixed pressure plate 81 is provided within the drum 80 on one side of the disc and an annular piston 82 is slidably disposed in an annular cavity 83 provided in the drum 80. A chamber 84 is provided between the piston 82 and the drum 80 for receiving fluid under pressure for actuating the piston 82. A spring 85 is disposed between the piston 82 and a spring retainer 86. The spring 85 is provided for returning the piston 82 to its disengaged position when fluid pressure is released from the chamber 84.

The brake 17 is effective on the shaft 57 and comprises the brake drum portion 80 and a brake band 87 engageable on the outer periphery of the drum. The brake band 87 may be brought into engagement with the brake drum 80 by any suitable servo motor (not shown).

The brake 18 is effective on the shaft 58 and comprises a brake drum 88 fixed to the shaft and a brake band 89 engageable on the outer periphery of the drum. The brake band 89 may be brought into engagement with the brake drum 88 by any suitable servo motor (not shown).

The brake 19 is effective to hold the ring gear 53 stationary and comprises the brake drum 61 and a brake band 90 engageable on the outer periphery of the drum. The brake band 90 may be brought into engagement with the drum 61 by any suitable servo motor (not shown).

The transmission is provided with fluid pumps 91 and 92 for supplying fluid pressure to the chambers 46, 76, and 84 of the clutches 13, 15, and 16 respectively and to the servo motors (not shown) of the friction brakes 17, 18, and 19, for actuating the clutches and brakes for providing different speed ratios for the transmission. The pump 92 is driven by an extensi on the converter housing 22 and comprises an outer gear 93 rotatably disposed within a casing 94 and an inner gear 95 in mesh with the outer gear 93 at one point and separated from the outer gear at another point by a crescent shaped casing portion 96.

The fluid pump 91 is similar in construction and operation to the pump 92 and comprises a casing 97, an outer gear 98, an inner gear 99, and a crescent shaped casing portion 100. The gear 99 is fixed on the shaft 11 so as to be driven thereby.

The presently disclosed transmission provides five (5) forward speed drives and a drive in reverse. First speed forward drive is obtained through the torque converter by engaging the clutch 15 and the brake 19. The first speed power train extends from the drive shaft 10 to the torque converter 14, the shaft 29, the engaged clutch 15, the hub 67, the intermediate shaft 12, the ring gear 52, the planet gears 54, and the planet gear carrier 56 to the driven shaft 11. The brake 19 is effective to hold the ring gear 53 of the planetary gear set stationary, so that the ring gear 53 constitutes the reaction element of the gear set. In first speed forward drive the over-all torque ratio is the product of the torque multiplication produced by the torque converter 14 and the planetary gear set 20.

It may be desirable to have a direct connection between the drive shaft 10 and the planetary gear set 20 in first speed forward drive whereby the converter is locked out or bypassed and the only torque multiplication is that obtained by the gear set. It is possible with the present transmission to shift from the first speed drive through the converter to a first speed direct drive by disengaging the clutch 15 and applying the clutch 13 while retaining the brake 19 engaged. The drive is then transmitted directly from the drive shaft 10 through the clutch 13 to the intermediate shaft 12, the ring gear 52, the planet gear 54, and the planet gear carrier 56 to the driven shaft 11. As in first speed drive through the torque converter, the ring gear 53 constitutes the reaction element of planetary gear set 20. Since the torque converter 14 is bypassed in this arrangement the only torque multiplication impressed on the driven shaft 11 is that which is obtained through the planetary gear set 20.

Second speed forward drive, as seen in the chart in Fig. 5, is obtained through the torque converter only. Second speed forward drive is obtained by engaging the clutch 16 and the brake 18. The drive is transmitted from the drive shaft 10 to the torque converter 14, the shaft 29, the drum 69, the drum 80, the shaft 57, the large sun gear 51, the planet gears 54, and the planet gear carrier 56 to the driven shaft 11. The engagement of the brake 18 holds the sleeve shaft 58 and thus the sun gear 50 is stationary so that the sun gear 50 constitutes the reaction element of the gear set. The over-all torque ratio in second speed forward drive is the product of the torque multiplication produced by the torque converter 14 and the planetary gear set 20.

Third speed forward drive may be obtained through either the torque converter 14 or through the direct drive clutch 13. The drive through the torque converter may be obtained by engaging the clutch 15 and the brake 17. The drive is transmitted from the drive shaft 10 to the torque converter 14, the shaft 29, the hub 67, the intermediate shaft 12, the ring gear 52, the planet gears 54, and the planet gear carrier 59 to the driven shaft 11. The application of the brake 17 to the drum 80 brakes the large sun gear 51 so that the sun gear 51 is the reaction element of the planetary gear set. The torque ratio obtained in third speed forward drive through the torque converter is the product of the torque multiplication produced by the torque converter 14 and the gear set 20.

Third speed forward drive can also be obtained by engaging the direct drive clutch 13 and applying the brake 17. The drive is then from the drive shaft 10 to the clutch 13, the intermediate shaft 12, the ring gear 52, the planet gears 54, and the planet gear carrier 56 to the driven shaft 11. The brake 17 holds the sun gear 51 stationary to provide the reaction element for the planetary gear set 20 in the same manner as in third speed forward drive through the torque converter 14. The torque ratio in third speed forward drive through the direct drive clutch 13 is only that ratio obtained by the gear set 20 since the torque converter is bypassed at this time.

Fourth speed forward drive, which has a gear ratio of one-to-one, may be obtained either through the torque converter 14, the direct drive clutch 13, or by splitting the drive between the direct drive clutch 13 and the torque converter 14.

Fourth speed forward drive through the torque converter is obtained by engaging the clutches 15 and 16 so that the drive is from the drive shaft 10 to the torque converter 14, the shaft 29, the clutch 15, the hub 67, the intermediate shaft 12, the ring gear 52, the planet gears 54, and the planet gear carrier 56 to the driven shaft 11. Since clutch 16 is also engaged, the drive also extends from the drive shaft 10 to the torque converter 14, the shaft 29, the clutch 15, the drum 69, the clutch 16, the drum 80 and the shaft 57 to the sun gear 51. Thus the ring gear 52 and the sun gear 51 rotate at substantially the same speed.

Fourth speed forward drive may also be provided by engaging the clutches 13, 15 and 16. Engagement of the clutches 15 and 16 as above pointed out, causes the ring gear 52 and the sun gear 51 to be effectively locked together and as a result, the carrier 56 and the drive shaft 11 are driven at the same speed as the drive shaft 10.

By engaging the clutches 13 and 16, a fourth speed forward drive may be obtained wherein power from the drive shaft 10 splits. The drive extends through the direct drive clutch 13 to the ring gear 52 and from the drive shaft 10 to the torque converter 14 and through the clutch 16 to the sun gear 51. When all of the elements of the torque converter 14 rotate at substantially the same speed, the torque converter is functioning as a fluid coupling, and the ring gear 52 and the sun gear 51 rotate at substantially the same speed. In effect, the gear set 20 is locked up and the driven shaft 11 is driven at the same speed as the drive shaft 10. During the split fourth forward drive, if the load on the driven wheels of the vehicle increases sufficiently, there will be a slight amount of slippage in the torque converter 14 and the sun gear 51 will consequently rotate at a slightly reduced speed with respect to the ring gear 52 so that the drive ratio between the drive shaft 10 and the driven shaft 11 will drop to less than one-to-one whereby torque multiplication is provided through the converter.

Fifth speed forward drive, which is an overdrive, may be obtained through either the torque converter 14 or the direct drive clutch 13. Fifth speed forward drive through the torque converter may be obtained by engaging the clutch 15 and the brake 18. The drive is then transmitted from the drive shaft 10 to the torque converter 14, the shaft 29, the clutch 15, the hub 67, the intermediate shaft 12, the ring gear 52, the planet gears 54, and the planet gear carrier 56 to the driven shaft 11. The application of the brake 18 holds the sun gear 50 stationary and this sun gear constitutes the reaction element of the gear set 20.

Fifth speed forward drive through the direct drive clutch 13 may be obtained by engaging the clutch 13 and the brake 18. The drive at this time extends from the drive shaft 10 through the clutch 13 to the intermediate shaft 12, the ring gear 52, the planet gears 54, and the planet gear carrier 56 to the driven shaft 11.

Reverse drive is obtained through the transmission by engaging the clutch 16 and applying the brake 19. For this drive, the power is transmitted from the drive shaft 10 through the torque converter 14 to the shaft 29, the drum 69, the clutch 16, the drum 80, the shaft 57, the sun gear 51, the planet gears 54, and the planet gear carrier 56 to the driven shaft 11. The application of the brake 19 holds the ring gear 53 stationary so that this member is the reaction element of the planetary gear set 20. With the ring gear 53 being held stationary, the sun gear 51 will rotate the planet gears 54 reversely to drive the planet gear carrier 56 and the driven shaft 11 reversely at a reduced speed.

It is contemplated that various ones of the clutches and/or brakes may not be used or may be eliminated from the transmission to give different arrangements of forward speed drives with the presently disclosed planetary gear set. The chart shown in Fig. 5 of the drawings shows the various combinations of forward speed drives that may be obtained by not using or eliminating certain ones of the clutches and/or brakes.

As seen in the chart of Fig. 5, the direct drive clutch 13 and the brake 17 may be eliminated from the transmission and the transmission will then provide four speeds forward and a drive in reverse, the forward speed drives being at gear ratios of, for example, as shown in Fig. 5, 2.07, 1.83, 1.00, and 0.662. As shown in the chart if only a three speed transmission is desired, the first speed drive can be eliminated and the vehicle can be started in the disclosed second speed forward drive.

By eliminating the direct drive clutch 13 and the small sun gear brake 18, a transmission having three forward speed drives and a drive in reverse can be obtained as seen in Fig. 5.

By eliminating the clutch 15 only, a transmission is provided which gives four forward speeds and a drive in reverse, the gear ratios of the four forward speeds being 1.83, 1.41, 1.00 and 0.662.

By eliminating the clutch 15 and the brake 17, a transmission having three forward speeds and a drive in reverse is obtained, the gear ratios for the three speeds being 1.83, 1.00 and 0.662.

It is to be understood that the choice of gear teeth and the gear ratios disclosed in Fig. 5 are for illustrative purposes only and can be changed without departing from the scope of the present invention. The particular gear ratios shown are obtained by providing the following number of teeth to the gear elements of the planetary gear set:

Ring gear 52 _____ 74
Ring gear 53 _____ 79
Sun gear 51 _____ 30
Sun gear 50 _____ 25

It is also to be understood that the elements that are not used in obtaining the different disclosed power trains may be, but do not need to be included in the transmission.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. In a transmission, the combination of a drive shaft, a driven shaft, an intermediate shaft, a planetary gear set between said drive and driven shafts including a first sun gear, a second sun gear, a first ring gear, a second ring gear, a plurality of first planet gears in mesh with said second sun gear and said first ring gear, a plurality of second planet gears in mesh with said first sun gear and said second ring gear and also in mesh with said first planet gears, and a planet gear carrier, said planet gear carrier being connected to said driven shaft, a hydraulic torque converter including an impeller and a turbine, said first ring gear being connected to said intermediate shaft, a first clutch for connecting said intermediate shaft to said drive shaft, a second clutch for connecting said second sun gear to said turbine, a third clutch for connecting said intermediate shaft to said turbine, a first brake for holding said second ring gear against rotation, a second brake for holding said first sun gear against rotation, a third brake for holding said second sun gear against rotation, said impeller being connected to said drive shaft, means for effecting a low speed power train between said drive and driven shafts including said third clutch and said first brake, means for effecting a second speed power train between said drive and driven shafts including said second clutch and said second brake, means for effecting a third speed power train between said drive and driven shafts including said third clutch and said third brake, means for effecting a fourth speed power train between said drive and driven shafts including said first, second, and third clutches, means for effecting a fifth speed power train between said drive and driven shafts including said third clutch and said second brake, and means for effecting a reverse speed power train between said drive and driven shafts including said second clutch and said first brake.

2. In a transmission, the combination of a drive shaft, a driven shaft, an intermediate shaft, a planetary gear set between said drive and driven shafts including a first sun gear, a second sun gear, a first ring gear, a second ring gear, a plurality of first planet gears in mesh with said second sun gear and said first ring gear, a plurality of second planet gears in mesh with said first sun gear and said second ring gear and also in mesh with said first planet gears, and a planet gear carrier, said planet gear carrier being connected to said driven shaft, said first ring gear being connected to said intermediate shaft, a hydraulic torque converter including an impeller and a turbine, a first clutch for connecting said second sun gear to said turbine, a second clutch for connecting said intermediate shaft to said turbine, a first brake for holding said second ring gear against rotation, a second brake for holding said first sun gear against rotation, a third brake for holding said second sun gear against rotation, said impeller being connected to said drive shaft, means for effecting a low speed power train between said drive and driven shafts including said second clutch and said first brake, means for effecting a second speed power train between said drive and driven shafts including said first clutch and said second brake, means for effecting a third speed power train between said drive and driven shafts including said second clutch and said third brake, means for effecting a fourth speed power train between said drive and driven shafts including said first clutch and said second clutch, means for effecting a fifth speed power train between said drive and driven shafts including said second clutch and said second brake, and means for effecting a reverse speed power train between said drive and driven shafts including said first clutch and said first brake.

3. In a transmission, the combination of a drive shaft, a driven shaft, an intermediate shaft, a planetary gear set between said drive and driven shafts including a first sun gear, a second sun gear, a first ring gear, a second ring gear, a plurality of first planet gears in mesh with said second sun gear and said first ring gear, a plurality of second planet gears in mesh with said first sun gear and said second ring gear and also in mesh with said first planet gears, and a planet gear carrier, said planet gear carrier being connected to said driven shaft, a hydraulic torque converter including an impeller and a turbine, said first ring gear being connected to said intermediate shaft, a first clutch for connecting said second sun gear to said turbine, a second clutch for connecting said intermediate shaft to said turbine, a first brake for holding said second ring gear against rotation, a second brake for holding said first sun gear against rotation, said impeller being connected to said drive shaft, means for effecting a low speed power train between said drive and driven shafts including said second clutch and said first brake, means for effecting an intermediate speed power train between said drive and driven shafts including said first clutch and said second brake, means for effecting a substantially one to one power train between said drive and driven shafts including said first clutch and said second clutch, means for effecting an overdrive speed power train between said drive and driven shafts including said second clutch and said second brake, and means for effecting a reverse speed power train between said drive and driven shafts including said first clutch and said first brake.

4. In a transmission, the combination of a drive shaft, a driven shaft, an intermediate shaft, a planetary gear set between said drive and driven shafts including a first sun gear, a second sun gear, a first ring gear, a second ring gear, a plurality of first planet gears in mesh with said second sun gear and said first ring gear, a plurality of second planet gears in mesh with said first sun gear and said second ring gear and also in mesh with said first planet gears, and a planet gear carrier, said planet gear carrier being connected to said driven shaft, said first ring gear being connected to said intermediate shaft, a first clutch for connecting said second sun gear to said turbine, a second clutch for connecting said intermediate shaft to said turbine, a first brake for holding said second ring gear against rotation, a second brake for holding said second sun gear against rotation, said impeller being connected to said drive shaft, means for effecting a low speed power train between said drive and driven shafts including said second clutch and said first brake, means for effecting an intermediate speed power train between said drive and driven shafts including said second clutch and said second brake, means for effecting a high speed power train between said shafts including said first clutch and said second clutch, and means for effecting a reverse speed power train between said drive and driven shafts including said first clutch and said first brake.

5. In a transmission, the combination of a drive shaft, a driven shaft, an intermediate shaft, a planetary gear set between said drive and driven shafts including a first sun gear, a second sun gear, a first ring gear, a second ring gear, a plurality of first planet gears in mesh with said second sun gear and said first ring gear, a plurality of second planet gears in mesh with said first sun gear and said second ring gear and also in mesh with said first planet gears, and a planet gear carrier, said planet gear carrier being connected to said driven shaft, said first ring gear being connected to said intermediate shaft, a hydraulic torque converter including an impeller and a turbine, a first clutch for connecting said intermediate shaft to said drive shaft, a second clutch for connecting said second sun gear to said turbine, a first brake for holding said second ring gear against rotation, a second brake for holding said second sun gear against rotation, a third brake for holding said first sun gear against rotation, said impeller being connected to said drive shaft, means for effecting a low speed power train between said drive and driven shafts including said second clutch and said second brake, means for effecting an intermediate speed power train between said drive and driven shafts including said first clutch and said third brake, means for effecting a high speed power train between said drive and driven shafts including said first clutch and said second clutch, means for effecting an overdrive speed power train between said drive and driven shafts including said first clutch and said second brake, and means for effecting a reverse speed power train between said drive and driven shafts including said second clutch and said first brake.

6. In a transmission, the combination of a drive shaft, a driven shaft, an intermediate shaft, a planetary gear set between said drive and driven shafts including a first sun gear, a second sun gear, a first ring gear, a second ring gear, a plurality of first planet gears in mesh with said second sun gear and said first ring gear, a plurality of second planet gears in mesh with said first sun gear and said second ring gear and also in mesh with said first planet gears, and a planet gear carrier, said planet gear carrier being connected to said driven shaft, said first ring gear being connected to said intermediate shaft, a hydraulic torque converter including an impeller and a turbine, a first clutch for connecting said intermediate shaft to said drive shaft, a second clutch for connecting said second sun gear to said turbine, a first brake for holding said second ring gear against rotation, a second brake for holding said second sun gear against rotation, said impeller being connected to said drive shaft, means for effecting a low speed power train between said drive and driven shafts including said second clutch and said second brake, means for effecting a high speed power train between said drive and driven shafts including said first clutch and said second clutch, means for effecting an overdrive speed power train between said drive and driven shafts including said first clutch and said second brake, and means for effecting a reverse speed power train between said drive and driven shafts including said second clutch and said first brake.

References Cited in the file of this patent
UNITED STATES PATENTS

| | | |
|---|---|---|
| 2,194,954 | Ravigneaux | Mar. 26, 1940 |
| 2,302,714 | Pollard | Nov. 24, 1942 |
| 2,582,487 | Kelbel | Jan. 15, 1952 |
| 2,605,652 | Kelbel | Aug. 5, 1952 |
| 2,699,074 | Livezey | Jan. 11, 1955 |